Dec. 30, 1969   E. PYMM   3,486,875
OUTLINE IMAGE CONTROLLED GLASS BLOWING MACHINE
Filed Aug. 16, 1966   2 Sheets-Sheet 1
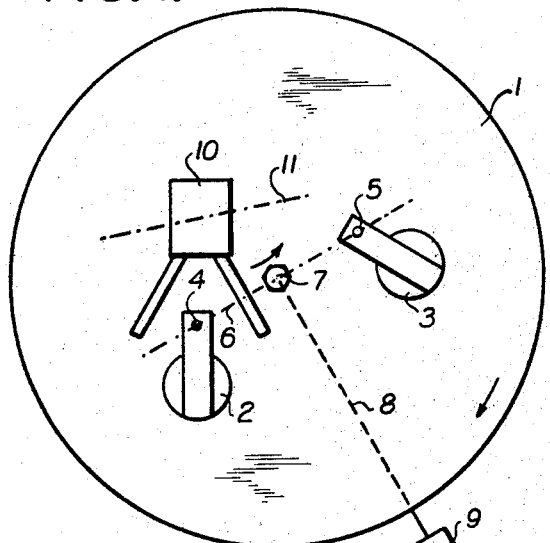
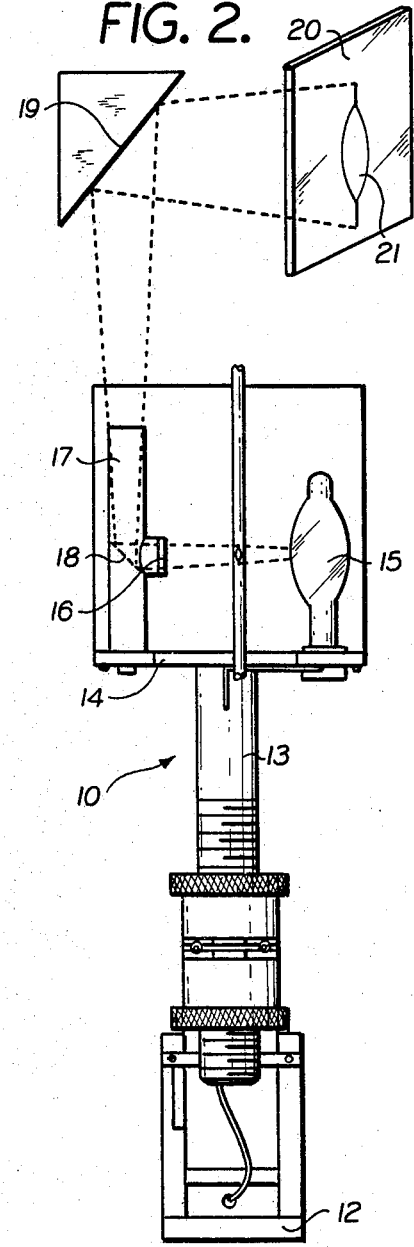
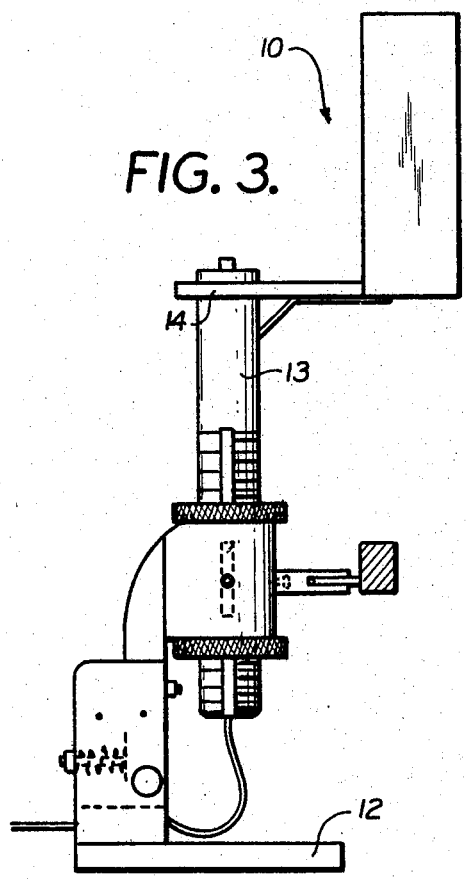
INVENTOR
EDWARD PYMM
BY
ATTORNEY.

Dec. 30, 1969     E. PYMM     3,486,875
OUTLINE IMAGE CONTROLLED GLASS BLOWING MACHINE
Filed Aug. 16, 1966     2 Sheets-Sheet 2

INVENTOR
EDWARD PYMM
BY
ATTORNEY

United States Patent Office 3,486,875
Patented Dec. 30, 1969

3,486,875
OUTLINE IMAGE CONTROLLED GLASS
BLOWING MACHINE
Edward Pymm, 149 Powers St., Brooklyn, N.Y. 11211
Filed Aug. 16, 1966, Ser. No. 572,778
Int. Cl. C03b 23/08
U.S. Cl. 65—158        5 Claims

ABSTRACT OF THE DISCLOSURE

The invention consists of projecting at least part of the outline of the hot portion of a glass tube—which is to be predeterminedly deformed—onto a light responsive cell to produce signals corresponding to the outline, and to control with these signals a switch which in turn controls the air blower feeding the glass tube, permitting the air flow to pass at one outline and to stop at another outline.

---

This invention relates to glass blowing machines, and more particularly, to the blowing of bulbular or other shapes, such as used in thermometers or similar devices.

One of the objects of the invention is to increase accuracy of shape by adjusting the air blown into or onto the glass under the control of a projection of the shape.

Another object of the invention is to provide visually or photoelectrically controlling projecting means arranged in the path of the article to be blown adjustably in accordance with the invention.

More specifically, in accordance with further features of the invention, the projection means are arranged on a more or less standard index controlled multi-station glass blowing machine, in which at one or several stations, the projection means in accordance with the invention, are arranged to be inserted into an operative position under control of the indexing mechanism of the multi-station desk, so as to effect the control of the shape of the glass article to be blown adjustably in accordance with the invention.

Still another object of the invention is to provide for the blowing of a thermometer bulb under control of a device serving to project the picture of the bulb onto a predetermined plane and to control the air blown into the bulb in accordance with the position of the projection on that predetermined plane.

Further an embodiment of the invention is to provide in the projection plane a predetermined outline or drawing of the bulb and to bring the picture of the bulb projected during blowing in coincidence with the predetermined outline by adjusting the amount of air blown into the tube.

Alternatively or simultaneously, as still another object of the invention, the outline of the desired bulb shape is determined by the position of photoelectric cells or openings behind which photoelectric cells are located which, under control of the projection, will operate the air flow so as to cause coincidence between the projected shape of the bulb and a predetermined outline thereof.

Still another object of the invention is to provide several multiples of photoelectric cells or corresponding openings on the projection plane, corresponding to different positions of the bulb, each pair defining the predetermined shape of the bulb to be desired, and the photoelectric cells or openings of a predetermined pair of photo cells to be effective to control the air blown into the tube so as to effect coincidence of the actual bulb shape with a predetermined bulb shape.

These and other objects of the invention are more fully apparent from the drawings annexed herein, in which FIG. 1 shows in a top view schematically the arrangement and connection of a projection device in accordance with the invention on a multi-station index controlled glass blowing machine for the production of thermometers.

FIG. 2 shows, in a horizontal elevation, an example of a specific projection device such as may be used in combination and in connection with a glass blowing machine.

FIG. 3 shows a corresponding side view.

Figure 5:
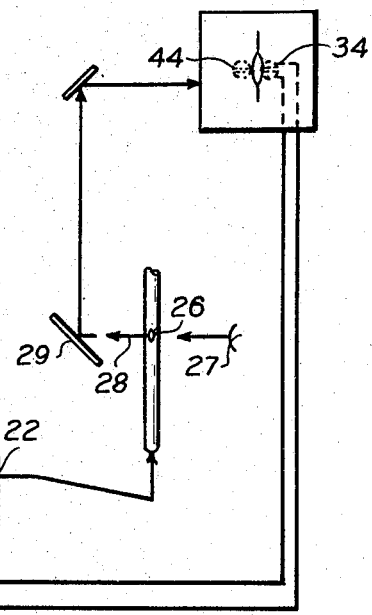
Figure 6:
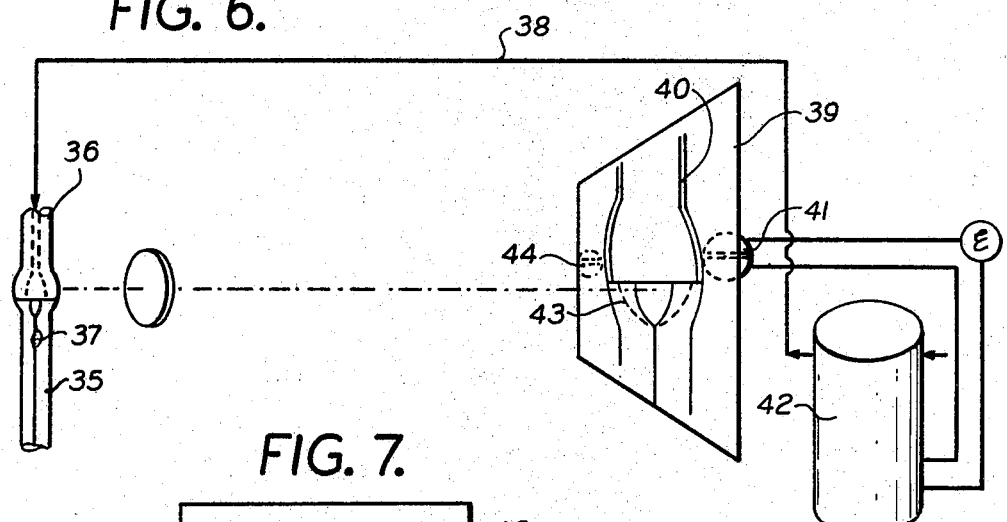

FIG. 5, a modification thereof,

FIG. 6, another modification.

As apparent from FIG. 1, part 1 represents an index controlled multi-station glass blowing table. The driving or indexing mechanism for table 1 is known per se and not shown. Table 1 supports at 2 and 3 glass blowing stations holding a thermometer tube, 4, 5 in a predetermined vertical position and it moves, for example, tube 4, after having been brought to previous exposure, to gas flames of predetermined positions, to a certain temperature into position ready to be blown up by the injection of air in this position air is applied over line 6 from a central valve 7.

Valve 7 is known per se and electrically operated through a line schematically indicated at 8, by a switch schematically shown at 9.

Switch 9 permits the amount of air passing through valve 7 into tube 4 to be varied in a predetermined manner.

Simultaneously with permitting air to be blown into tube 4 in one position of switch 9, a projection device schematically indicated at 10, is rotated or swung in over a horizontal axis schematically shown in FIG. 1 at 11, into a position operative on tube 4 and station 2.

As soon as the blowing operation is finished, by shutting down air valve 7 in another position of switch 9 projection device 10 is rotated under control of the indexing mechanism of table 1, out of the way of station 2, and will permit station 3 to assume the position now assumed by a station 2, with respect to projection device 10.

Projection device 10 is more clearly apparent from the front and side elevation of FIGS. 2 and 3 respectively.

It consists essentially of a frame 12, holding an adjustable screw 13 in an upright position, which in turn holds on a bracket 14 the projection device proper, consisting of a lamp 15, a lens 16, and a tube 17 containing a mirror 18 projecting the light of lamp 15, over another mirror 19 onto a predetermined vertical plane, containing for example, as shown in FIG. 2, a screen 20, on which the picture of the bulb or the bulb portion of the glass tube (not shown in this figure) is shown at a properly enlarged state.

Figure 4:
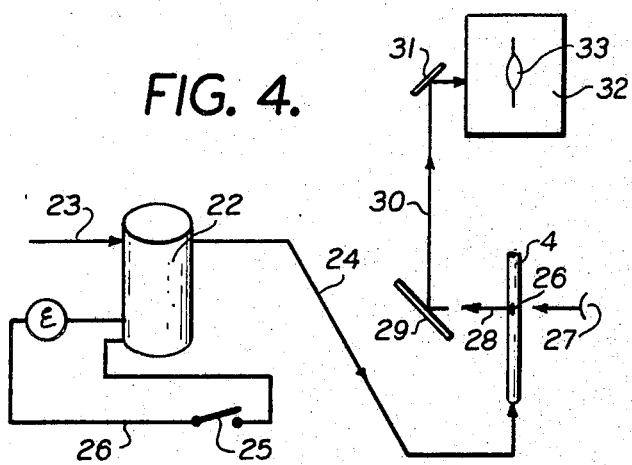
FIG. 4 shows in schematical form, and partly in the form of a circuit diagram, some of the principles involved in the invention.

In the embodiment shown in FIG. 2, the picture of a predetermined or desired glass blub shape is also shown or illustrated on screen 21 and the comparison of these two pictures, the actual one and the projected one, permits the observer, and even an unskilled operator of the machine, to expand the bulb to the desired shape by simply changing the amount of air passing through the thermometric tube, shown in FIG. 4 at 4, by the turning on and off of switch 9 which through the air valve 7 permits and forbids access of air in this particular position of the indexing table 1.

The operation of this arrangement is diagrammatically explained in FIG. 4 in which the air valve is indicated at 22 with an incoming airline at 23 and an outgoing airline at 24. The air valve 22 is electrically controlled, in otherwise well-known manner, and a microswitch, schematically indicated at 25, controls the air valve 22 in such a way as to permit the operator to turn the air on and off. In accordance with an observation of the picture of bulb 26 the image of bulb 26 is projected from light source schematically indicated at 27 in the direction of arrow 28 and directed over mirror 29, arrow 30, reflector 31, onto screen 32. Screen 32 also contains the desired picture or outline or points of registration or other representations of the bulb schematically indicated at 33.

All that the operator has to do is to turn on or shut off the air flow in tube 4, depending upon the coincidence of the two representations, the drawn one and the one projected on screen 33.

In the modification of FIG. 5, alternatively or in combination with FIG. 4, the position of the bulb image with respect to the desired projection shape is controlled automatically by a photoelectric cell, schematically indicated at 34, which is energized from the light of the projected picture in a position corresponding to predetermined registrations or representations thereof, but otherwise in a manner similar to that shown in FIG. 4 supplies the air valve 22 with the necessary electric current to shut it off.

In a further modification, shown in FIG. 5, the projection device is not only used to control the size of one bulb but also the connection of one bulb with another bulb.

In this particular case, a thermometric glass tube, schematically indicated at 35, is to be smoothly connected with another tube, schematically indicated at 36, to produce the large end bulb of a thermometer, which is provided in addition to the intermediate bulb, such as shown in FIG. 6 at 37.

In order to produce this end bulb 36, a second tube is attached properly heated, to tube 35 in the open position of air valve 42, air is blown through line 38, and simultaneously the corresponding joining portion of tubes 35 and 36 is projected on a screen 39; which has arranged hereon the projected image 40 and a photoelectric cell 41 in a position which determines at least part of a predetermined outline of the joints. As soon as the projected image 40 reaches photoelectric cell 41, air vlave 42 will be shut off, an extremely smooth transition between the two tubes 36 and 34 in the form of a bulb schematically indicated by dotted line 43 can be obtained automatically, but naturally, also if necessary, alternatively or simultaneously, by the application of a manual switch controlling valve 42 which remains turned on the two representations on screen 39—the projected one and the predetermined one coincide, and then it will be turned off by the switch.

More specifically, the photoelectric cells need not be arranged on, or form part of, the observation screen itself, but may be placed on a separate plane or holder, arranged behind the observation screen, which in this case may be wholly or partially transparent, or provided with apertures permitting the projected picture or part thereof in predetermined positions thereof to fall upon and operate the photoelectric cells.

It is also feasible to define the desired outline of the bulb of a thermometer tube or two or more photoelectric cells or apertures cooperating with such photoelectric cells, as schematically indicated in FIG. 5 at 31, 44 respectively, and to further cause the switching of the air valve in one or the other direction, depending upon the expansion of the bulb which is to be desired to conform with a predetermined size or shape.

Figure 7:
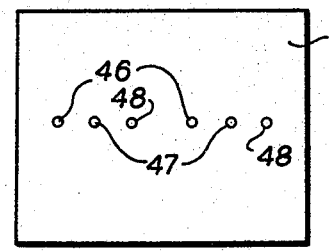

In still further an embodiment of the invention as apparent from FIG. 7, pairs of photoelectric cells or corresponding apertures are arranged on a plane or screen schematically shown in FIG. 7 at 45 and in positions indicated at 46, 47 and 48 respectively. In this way, it becomes possible to control the size of the bulb substantially independent from its absolute lateral position on the screen which in many cases may vary, and frequently the manufacturer is not so much interested in the relative position of the bulb with respect to the tube axis but only in the size of the bulb.

The modification shown in FIG. 7 permits for a number of different lateral positions of the bulb, for example for three positions, corresponding picture pairs 46, 47, 48 respectively, to obtain the desired predetermined size or the bulb position corresponding to one pair of photoelectric cell positions 46, 47 and 48. In this way, each of these photoelectric cell pairs may be used to control the air flow in more or less the same way as has been described and shown with respect to FIGS. 2 through 6 and all this without departing from the scope of this disclosure.

I claim:

1. In a glass blowing apparatus, a rotatable table for holding a number of glass tubes in a circular array in vertical position, means for rotating said table so as to heat said glass tubes, one after another, at a predetermined portion thereof in one position of said table, air blowing means connected to the glass tube in a subsequent position of said table, means arranged fixedly with respect to the rotation of said table, including light responsive means, for projecting at least part of an outline of the heated portion onto said light responsive means to produce signals corresponding to said outline, said projecting mean including a light source arranged on one side of the glass tube, and switching means controlled by said light responsive means and controlling said air blowing means to permit air flow and expansion of said heated portion at one outline, and to stop air flow and expansion of said heated portion at another outline.

2. Apparatus according to claim 1 wherein said projecting means is arranged movable as a unit, to be moved out of operating position while a glass tube is being moved into said subsequent position.

3. Apparatus according to claim 1 wherein said light responsive means is arranged near a projection screen, and said screen in addition to carrying a projected outline of said tube portion, also carries superimposed thereon at least part of a predetermined outline for said tube portion.

4. Apparatus according to claim 1 wherein said air blowing means includes an electrically operated air valve, and wherein a screen is associated with at least one light responsive means arranged in a position to switch off said air valve, depending on a projected portion of said tube impinging said light responsive means.

5. Apparatus according to claim 4 wherein said screen is associated with several multiples of photoelectric means corresponding to different predetermined positions of said projected tube portion; the elements of each of said multiples determining the diameter of said tube portion to which it is to be expanded by said blowing means when said air valve is turned on.

References Cited

UNITED STATES PATENTS

| | | | |
|---|---|---|---|
| 1,848,940 | 3/1932 | Delpech | 65—29 XR |
| 2,150,017 | 3/1939 | Barnard | 65—158 XR |
| 2,753,459 | 7/1956 | Fedorchak | 65—158 XR |
| 3,202,043 | 8/1965 | Galey et al. | 65—158 XR |
| 3,304,834 | 2/1967 | Oelfisch et al. | 65—158 XR |
| 3,150,266 | 9/1964 | Mathias | 65—29 XR |
| 3,327,849 | 6/1967 | Sorbie. | |

FRANK W. MIGA, Primary Examiner

U.S. Cl. X.R.

65—29, 110, 161, 262